Figure 1:
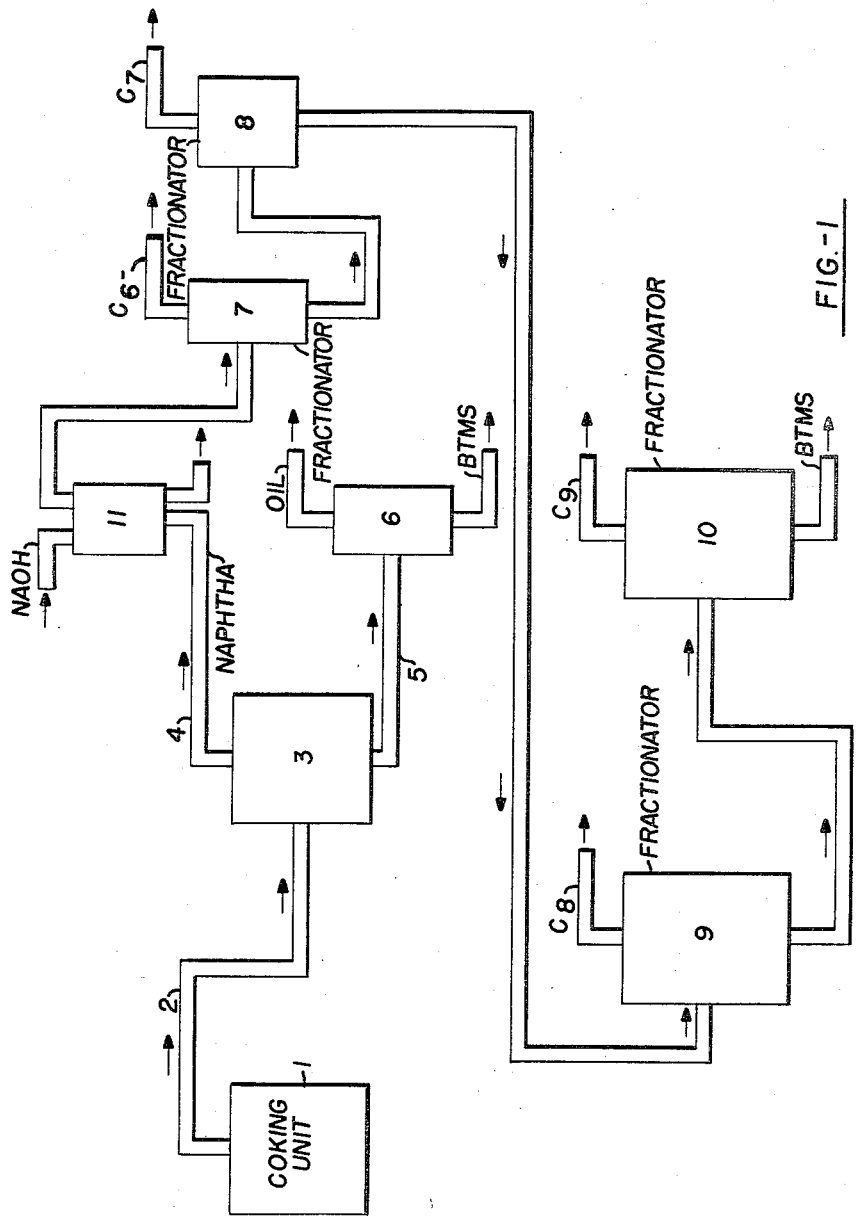

Robert S. Brodkey
Paul V. Smith, Jr.
Fred W. Banes
Inventors

By Henry Berk Attorney

United States Patent Office 2,846,464
Patented Aug. 5, 1958

2,846,464

OXO SYNTHESIS OF ALCOHOLS FROM HEAVY PETROLEUM COKING REACTION

Robert S. Brodkey, Roselle, N. J., Paul V. Smith, Jr., Sunningdale, England, and Fred W. Banes, Westfield, N. J., assignors to Esso Research and Engineering Company, a corporation of Delaware Application September 25, 1956, Serial No. 611,816

6 Claims. (Cl. 260—475)

The present invention relates to the preparation of oxygenated organic compounds by the reaction of carbon monoxide and hydrogen with olefinic hydrocarbons in the presence of a carbonylation catalyst. More specifically, the present invention relates to the preparation of improved alcohol products from the reaction of carbon monoxide, hydrogen, a cobalt carbonylation catalyst and novel selected carbonylation feeds. Still more specifically this invention relates to the preparation of alcohols useful as intermediates in the preparation of superior plasticizers employing a novel olefin-containing feed treated in a specific manner.

The current and future use of plastic compositions such as polyvinyl chloride polymers or copolymers, polyvinyl acetates, cellulose esters, acrylate and methacrylate resins, rubbers such as the emulsion copolymers of butadiene and styrene or acrylonitrile, or the copolymers of isobutylene with diolefins such as isopreme have created a large demand for suitable plasticizers. Alkyl esters and particularly di-2-ethyl hexyl phthalate, di-n-octyl phthalate and tri-2-ethyl hexyl phosphate have been used as plasticizers for the aforementioned high molecular weight materials, but the supply of high quality plasticizers has been unable to keep pace with the expansion of the plastics industry, largely due to the shortage of alcohols suitable in the manufacture of the desired esters.

Today one of the best known processes for the preparation of primary alcohols suitable for use as intermediates in the preparation of plasticizers involves the carbonylation or so-called "oxo" synthesis wherein an olefin is reacted with hydrogen and carbon monoxide in the presence of a cobalt catalyst under elevated temperatures and pressures to form carbonyl compounds comprising principally aldehydes containing one more carbon atom than the starting olefin compound. In this process the aldehyde mixture is first decobalted or purified and then hydrogenated generally over a sulfur insensitive catalyst such as molybdenum sulfide to form the corresponding alcohols. The alcohols formed by this process are generally a mixture of various isomers including, for example, n-octanol, 2-ethyl hexanol and more highly branched isomers. The specific isomer alcohol composition is generally determined by the oxo feed employed, the conditions of oxonation as well as the catalyst all of which effect to some extent the degree of isomerization during the oxo reaction.

With the introduction of this process there was thus made available for the production of higher molecular weight primary alcohols the large number of refinery streams containing olefin fractions derived and resulting from the processing of petroleum distillates and residua. Thus available on a large scale are olefin fractions from thermal and catalytic cracking processes, olefin polymers and copolymers such as propylene and butylene dimers, trimers, tetramers or their copolymers and the like prepared in accordance with the well known UOP polymerization process.

Recently suitable oxo feed stocks have been prepared by steam cracking petroleum oils. However, in order to obtain a suitable oxo feed from a steam cracking operation it is first necessary to thermally soak the fraction and then to treat the steam cracked product with a polymerization catalyst, thereby removing undesirable constituents which would inhibit the oxo reaction and which would result in poor quality alcohols. Thus while the discovery that steam cracked fractions could be utilized as oxo feed stocks has been an advance in the art, the disadvantages relating to the use of such a feed stock, especially the increased cost required for the pretreatment of the oxo feed, leave something to be desired.

It has now been found that extremely good oxo feed stocks may be obtained by coking a heavy petroleum residuum without resort to the costly pretreatment associated with the aforementioned steam cracked petroleum fractions. It has been found that the naphtha obtained from a coking process may be utilized as an oxo feed by simply treating with an alkali agent and fractionating the naphtha into the various olefin containing hydrocarbon cuts, e. g. $C_6$, $C_7$, $C_8$, $C_9$, etc. It has further been found that the oxo alcohols obtained from a "coker naphtha" may be used to prepare plasticizers which are superior in heat stability, volatility and extractability to the plasticizers prepared by employing olefins derived from the UOP polymerization process. The present plasticizers have also been found to be superior to the relatively straight chain plasticizers with regard to volatility and Primol D extraction.

Any known process of coking heavy residual oils to produce naphtha fractions may suitably be employed. The particular coking process to be selected for the preparation of suitable oxo feed stocks will be largely a matter of choice. A preferred coking process and one which lends itself to the preparation of excellent oxo feed stocks is known in the art as a "fluidized coking" process. The fluidized coking process per se is old; nevertheless to complete the disclosure a brief description thereof will be given.

A fluid coking unit comprises basically a reaction vessel or coker and a heater or burner vessel. In a typical operation the heavy oil to be processed is injected into the reaction vessel containing a dense, turbulent, fluidized bed of hot inert solid particles, preferably coke particles, wherein a uniform temperature is maintained in the coking bed. In the reaction zone the feed stock is partially vaporized and partially cracked. Product vapors are removed from the coker vessel and sent to a fractionator for the recovery of gas and light distillates therefrom. Heavy bottoms are generally returned to the cooking vessel and the coke produced during the process remains in the bed coated on the solid particles. The heat for carrying out the endothermic coking reaction is generated in the heater or burner vessel. A stream of coke is continuously transferred from the reactor to the burner vessel. Sufficient coke or carbonaceous matter or added fuel such as natural gas or torch oil is burned in the burning vessel to bring the solids therein up to a temperature sufficient to maintain the heat balance.

The burner solids are maintained at a higher temperature than the solids in the reactor. About 5% of coke based on the feed or an equivalent amount of other carbonaceous material, such as fuel oil, natural gas, etc., is burned for this purpose. Suitable feeds for this fluid coking operation are heavy crudes, e. g. Hawkins crude, atmospheric and vacuum crude oil bottoms, pitch, asphalt, other heavy hydrocarbon petroleum residua or mixtures thereof. Typically, such feeds have an initial boiling point of about 370° C. or higher, an A. P. I. gravity of about 0° to 20° and a Conradson carbon residue content of about 5 to 40 wt. percent. Particle size should be maintained between 75 to 1000 microns in diameter, preferably between 150 to 400 microns.

Table I below sets forth the operating conditions for fluid coking in the fluid coker and burner:

Table I
CONDITIONS IN FLUID COKER REACTOR

| | Broad Range | Preferred Range |
|---|---|---|
| Temperature, °C | 454–740 | 480–540 |
| Pressure, Atmospheres | 1–10 | 1.5–2 |
| Superficial Velocity of Fluidizing Gas, Ft./Sec. | 0.2–2.0 | 0.5–1.5 |
| Particle Size Range of Coke Particles, Microns | 75–1,000 | 150–400 |

CONDITIONS IN BURNER

| | | |
|---|---|---|
| Temperature, °C | 565–870 | 590–650 |
| Superficial Velocity of Fluidizing Gas, Ft./Sec. | 1–5 | 2–4 |

A more detailed account of fluid coking for naphtha and the like products may be found in U. S. Patent 2,735,806 and the disclosure contained therein is incorporated herein in order not to unduly lengthen this application. Also many other U. S. patents describe the fluid coking process in detail.

As previously pointed out, when steam cracked or other thermally cracked fractions are employed as an oxo feed for the production of alcohols suitable as intermediates for plasticizers, it is necessary to pretreat the cracked stock in a series of steps including thermal soaking to remove cyclic diolefins, resinification or polymerization, generally in the presence of an aluminum chloride catalyst to remove diolefins and tertiary monoolefins, and extraction processes to remove aromatics. It has now been discovered that a naphtha obtained by the fluidized coking method briefly described above without the aforementioned pretreatment is an extremely suitable feed in the oxo synthesis in the preparation of superior alcohols and subsequently plasticizers.

While resinification or polymerization of components in a steam cracked fraction is necessary for the preparation of a good oxo feed, contrarywise the present coker naphtha is intentionally inhibited against oxidation or resinification by the use of such inhibitors as diphenyl amine, ethyl aniline, hexyl p-phenylene diamine, aminophenol, etc. Any anti-oxidant or inhibitor may be employed which will maintain the peroxide number at below 0.1. Preferably also if the naphtha cut is stored it should be protected against oxidation by employing an oxygen free inert gas, e. g. nitrogen. Distillation over caustic or treatment with other strong alkali or treatment with other known reducing agents will lower the peroxide number to within the acceptable limits, i. e. <0.1.

This process will be described in greater detail with reference to the drawings.

Figure 1 shows schematically the treatment of fluid coker naphtha by simple fractionation to recover $C_7$–$C_9$ olefin feeds for the oxo process.

*Example.*—A Hawkins atmospheric residuum having an initial boiling point of about 900° F. was coked by a process such as described in U. S. Patent 2,735,806, employing the operating conditions shown in Table II.

Table II

| | |
|---|---|
| Feed rate, total B/D | 44.3–78.0 |
| Coke circulation, lbs./min | 262–407 |
| Recycle gas to reactor cone | 35.1–36.6 |
| Reactor temperature, average bed, °C | 541–548 |
| Solids/oil ratio | 12.4–26.8 |
| Pressure, bottom, p. s. i. g | 16.4–18.4 |
| Equivalent steam, total, wt. percent | 41.4–70.4 |

Figure 2:
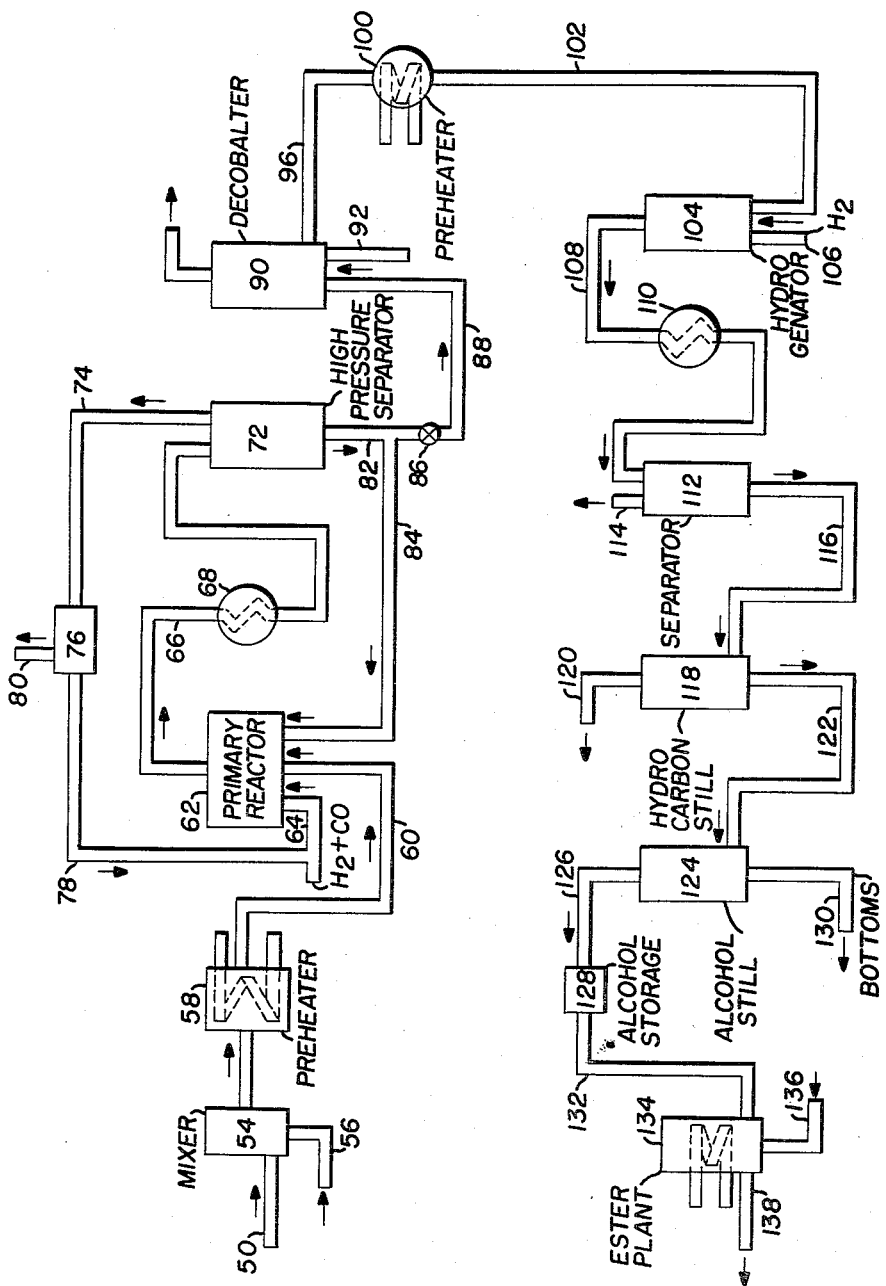

The distillate obtained from the fluid coking unit 1 is fed via line 2 to a first fractionating tower 3 wherein a naphtha fraction having an initial boiling point of 60° C. and a final boiling point of 228° C. is taken overhead via line 4. To the naphtha fraction is added an antioxidant amount of diphenyl amine, e. g. 1 lb. of inhibitor per 1000 gals. naphtha. Caustic washing may be employed at almost any point preferably prior to the final fractionation. By caustic washing it is meant to include the recovery of the naphtha distillate over aqueous caustic, e. g. 5–15 wt. percent NaOH in $H_2O$. The heavier ends are passed via line 5 to a fractionator 6 wherein heavier oils and still heavier bottoms are recovered for various uses not pertinent to this invention. The naphtha fraction is then passed first through a caustic wash tower and then through a series of fractionating towers 7, 8, 9 and 10 to recover cuts of $C_7$, $C_8$ and $C_9$ hydrocarbons, preferably boiling in the range recited in Table III. The desired fraction having a peroxide number of <0.1 is then passed to an oxo and ester plant as shown in Figure 2. If desired the coker naphtha fraction may be caustic washed first and then inhibited against oxidation.

Figure 2 of the drawing discloses a flow plan of the instant process starting with the oxonation stage through the final product of the desired ester.

The desired olefin or mixture of olefins is passed through line 50 to mixer 54, wherein cobalt naphthenate, oleate or other suitable cobalt catalyst is added through line 56 in such proportions that the amount of cobalt in solution is about 0.05 to 0.3 wt. percent of the total liquid. The mixture is then pumped to preheater 58 wherein it is brought to the desired temperature range, e. g. 150° C. and then discharged via line 60 into the bottom of primary carbonylation reactor 62. Reactor 62 comprises a high pressure reactor vessel which may, if desired, be packed with non-catalytic material such as ceramic rings, porcelain or quartz chips, pumice and the like. It may also be divided into discrete packed zones separated by any suitable means, such as support grids, etc., or it may comprise but a single packed zone, or it may contain no packing.

A stream of synthesis gas comprising $H_2$ and CO in the approximate ratio of 0.5/1–2.0/1 volumes $H_2$/CO, preferably 1.0–1.2/1, is fed into reactor 62 through line 64. The synthesis gas stream is a composite of fresh gas and recycle, and flows upwardly with the olefin feed through reactor 62. The latter is preferably operated at a pressure of about 2500 to 3500 p. s. i. g. and at a temperature range of about 120° to 200° C., the higher temperatures being used for the higher olefins. The rate of flow of synthesis gases and of olefin through reactor 62 is so regulated that the desired conversion level of olefin is obtained. These conditions include an olefin fresh feed rate of about 0.4 to 1.0 v./v./hr. or even higher, fresh synthesis gas feed rates of 1,000 to 10,000 cubic feet/barrel of olefin, and a nominal residence time of about 1 to 3 hours.

The carbonylation reaction may be carried out substantially adiabatically, that is, no external cooling means such as tubes or coils need be provided, but cooling and temperature control of the highly exothermic reaction is carried out by recycle of a portion of the product. Liquid oxygenated reaction products containing catalyst in solution, as well as unreacted synthesis gases are withdrawn from an upper portion of high pressure reactor 62 and transferred through line 66 and cooler 68 to high pressure separator 72 where unreacted gases are withdrawn overhead through line 74, scrubbed in scrubber 76 of entrained liquid, and preferably recycled to reactor 62 via lines 78 and 64. A portion of the recycle may be purged through line 80 to maintain the desired $H_2$/CO ratio in the feed.

Liquid carbonylation product containing dissolved therein relatively high concentrations of cobalt carbonyl is withdrawn from separator 72 via line 82. A portion of this stream may be recycled to reactor 62 via line 84 to aid in the cooling and maintenance of temperature control of the primary carbonylation stage. Preferably recycle liquid product is injected at various levels within reactor 62 to obtain close temperature control throughout the whole reactor. Approximately 400 to 500 volume percent of liquid reaction product on the fresh olefin feed may be recycled for this purpose. The temperature of such recycled material is generally dependent on that of the atmosphere, and may be about 0° to 40° C.

The balance of the primary reaction product not recycled to reactor 62, which may comprise, beside desired aldehyde, also unreacted olefins, secondary reaction products, and dissolved cobalt carbonyls, is withdrawn through pressure release valve 86 and line 88 and passed to decobalting zone 90. Within decobalter 90, soluble cobalt carbonyl is removed from the aldehyde product prior to high pressure hydrogenation in order to prevent its decomposition in the subsequent hydrogenation stage with consequent fouling of coils and reactor plugging. The decomposition of the cobalt carbonyl is obtained by heating the aldehyde product by such means as steam coils, etc., to about 90° to 240° C. at a pressure high enough to keep the components in the liquid phase. Pressures in the neighborhood of 100 to 150 p. s. i. g. are preferred. Other means of decobalting are known in the art, e. g. employing steam or acid and they may be used with equal efficiency in this process. The product containing catalyst in solution is injected into decobalter 90 through line 88 and a fluid, such as an inert stripping gas, water, steam, $H_2$, etc., may be added through line 92.

The liquid aldehyde product now substantially free of dissolved catalyst is withdrawn from 90 through line 96 and passed through preheater 100 to the bottom portion of hydrogenation reactor 104 via line 102. Simultaneously hydrogen is supplied to 104 through line 106 in proportions sufficient to convert the aldehydic product into alcohols. Hydrogenator 104 may contain a mass of any conventional hydrogenation catalyst, such as nickel, copper chromite, a sulfur resistant catalyst such as tungsten, nickel or molybdenum sulfide, preferably supported on carriers such as pumice, charcoal, kieselguhr, etc. Reactor 104 is preferably operated at temperatures of about 200° to 300° C. and pressures of about 2500 to 3500 p. s. i. g.

The products from the hydrogenation reactor and unreacted hydrogen may be withdrawn overhead through line 108, passed through cooler 110 and high pressure separator 112, whence $H_2$ is removed overhead through 114 for recycle. The liquid product is withdrawn from separator 112 through line 116 and, after passing through conventional low pressure separators and stabilizers (not shown), is passed to hydrocarbon still 118, wherein are distilled overhead low boiling products, mostly hydrocarbons. These materials are removed through 120 as a heads cut and may be used as gasoline blending agents. The bottoms from this primary distillation are withdrawn from hydrocarbon still 118 via line 122 and sent to alcohol still 124 where the desired alcohol cut is taken. While any alcohol cut may be taken, for ease of description isooctyl alcohol will be referred to. The alcohols are withdrawn overhead from still 124 through line 126 and sent to storage tank 128, from whence they are sent, if desired, to an esterification plant for conversion into a di-octyl ester, such as di-octyl phthalate, all in a conventional manner. High boiling bottoms from 124 may be withdrawn through line 130 and may be used in any desired manner, such as cracking stock fuel, etc., or they may be further processed and distilled at subatmospheric pressures to recover valuable oxygenated organic products.

Octyl alcohol is passed from alcohol storage 128 through line 132 to esterification unit 134. The octyl alcohol fraction is passed to the esterification plant and an acid or an anhydride, such as phthalic anhydride, is added through line 136 and esterification may proceed either catalytically in the presence of a small amount of an acid, such as sulfuric or benzene sulfonic, or it may proceed without a catalyst merely under the influence of heat. Excess alcohol, i. e. >2 mols of alcohol per mol of phthalic anhydride or acid is employed to effect high conversion levels. The esterification products are removed through line 138 and passed to the ester recovery system wherein the esters, such as di-octyl phthalate, are recovered in a conventional manner. Other acids or anhydrides may be used in lieu of phthalic acid or anhydride to form the corresponding esters such as the phosphates, adipates, azelates, sebacates, thiopropionates as well as similar esters of dibasic and tribasic acids.

The approximate boiling ranges of the coker naphtha olefin containing fractions, alcohols and esters contemplated by this invention are set forth below in Table III. It is to be understood that various mixtures may be employed and that it is not necessary to adhere strictly to the preferred boiling ranges set forth below.

Table III

| Oxo Feed Olefin | Olefin, ° C. | Alcohol, ° C. | Phthalate Ester, ° C. |
|---|---|---|---|
| $C_7$ | 77–98 | $C_8$—168–194 | 196–201 |
| $C_8$ | 117–128 | $C_9$—178–210 | 215–225 |
| $C_9$ | 135–150 | $C_{10}$—189–222 | 216–230 |

The various coker naphtha olefin cuts, e. g. $C_7$–$C_9$, obtained under the conditions set forth in Table II and having the boiling ranges set forth in Table III, were treated under the specific conditions set forth in Table IV below:

Table IV

|  | $C_7$ Olefin | $C_8$ Olefin | $C_9$ Olefin |
|---|---|---|---|
| Oxonation: Charge— |  |  |  |
| Olefin, ml | 345 | ¹ 200 | ¹ 310 |
| Catalyst, ml.,² Co Oleate | 100 | 100 | 150 |
| Temperature, ° C | 160 | 160 | 170 |
| $CO/H_2$: 1/1, p. s. i. g | 3,500 | 3,500 | 3,500 |
| Hydrogenation: |  |  |  |
| Temperature, ° C | 180 | 180 | 180 |
| Pressure $H_2$, p. s. i. g | 3,500 | 3,500 | 3,500 |
| Catalyst (60% Ni), Ni Supported on Kieselguhr, gms | 65 | 65 | 65 |
| Alcohol Distillation (15 plate Oldershaw 1 inch column): |  |  |  |
| Overhead, ° C | 168–194 | 178–210 | 189–222 |
| Reflux Ratio | 5/1 | 5/1 | 5/1 |
| Esterification: Charge— |  |  |  |
| Alcohol, grams | 88 | 70 | 94 |
| Phthalic Anhydride, grams | 46 | 30 | 40 |
| Toluene Sulfonic Acid | 1 | 1 | 1.5 |
| Toluene, ml | 100 | 100 | 117 |
| B. P. of Ester, ° C | 196–201 | 215–225 | 216–230 |

¹ 300 ml. of hexane added.
² 10% solution in hexane.

The following Table V sets forth a comparison of the esters derived from coker naphtha alcohols under the conditions set forth in Table IV and a steam cracked oxo feed. The steam cracked resin raffinate has been extensively treated by the series of steps which have been described briefly heretofore. For a more detailed description of the pretreatment applied to the steam cracked naphthas, reference may be had to copending application Serial No. 493,482, filed March 10, 1955.

Table V

| Alcohol | After 7 Days at 100° C. || Dynamic Modulus × 10⁻¹⁴ at 25° C. |
|---|---|---|---|
|  | Relative Elongation Retention ¹ | Percent Plasticizer Lost |  |
| Coker Naphtha, $C_8$ | 147 | 14 | 1.3 |
| Resin Raffinate from Steam Cracked Oil, $C_8$ | 149 | 11 | 1.3 |

¹ Taking plasticizer from UOP $C_8$ alcohol as standard.

The above table shows the $C_8$ alcohol ester derived from coker naphthas has about the same superior qualities as the esters derived from an extensively treated steam cracked fraction.

The following table sets forth a more complete comparison of coker naphtha esters and other oxo esters.

Table VI

|  | UOP, $C_8$ | Coker Naphtha Alcohol | | | UOP, $C_{10}$ |
|---|---|---|---|---|---|
|  |  | $C_8$ | $C_9$ | $C_{10}$ |  |
| Original Properties: |  |  |  |  |  |
| Tensile, p. s. i. | 3,170 | 3,265 | 3,430 | 3,270 | 2,820 |
| 100% Modulus, p. s. i. | 1,955 | 2,025 | 2,340 | 2,170 | 2,040 |
| Elongation, Percent. | 290 | 285 | 285 | 310 | 285 |
| Aged 7 Days at 100° C.: |  |  |  |  |  |
| Relative Tension/Elongation Retention | 100/100 | 109/147 | 110/140 | 105/132 | 105/100 |
| Volatility After 7 days at 100° C.: Percent Plasticizer Loss | 15.2 | 13.8 | 5.9 | 5.1 | 5.2 |
| Primol D Extraction after 7 Days at 52° C.: Percent Plasticizer Loss | 10.2 | 8.4 | 7.3 | 7.7 | 10.7 |

The data in the above tables show that $C_8$ alcohol from coker naphtha is superior to (UOP) $C_8$ alcohols derived by oxonation of $C_7$ propylene and butylene polymer for the preparation of plasticizers in heat stability, volatility and extractability. The coker naphtha $C_9$ and $C_{10}$ alcohols are similar to the $C_8$ alcohols and were found to be superior to UOP $C_{10}$ alcohols in heat stability and Primol D extraction.

What is claimed is:

1. In a carbonylation process wherein olefins are reacted with carbon monoxide and hydrogen and a cobalt carbonylation catalyst at elevated temperatures and pressures in a carbonylation zone to form an aldehyde reaction product and wherein said reaction product is hydrogenated to form an alcohol product, the improvement which comprises subjecting a heavy liquid petroleum fraction to a coking temperature within the range of 454° to 740° C. and a pressure of from 1 to 10 atmospheres to produce a distillate, fractionating said distillate into fractions containing $C_7$, $C_8$ and $C_9$ hydrocarbons and passing at least one of said fractions to said carbonylation zone.

2. A process in accordance with claim 1 wherein the distillate obtained from the coking operation is caustic treated and an anti-oxidant is added, thereby maintaining the peroxide number at about <0.1.

3. In a carbonylation process wherein olefins are reacted with carbon monoxide and hydrogen and a cobalt carbonylation catalyst at elevated temperatures and pressures in a carbonylation zone to form an aldehydic reaction product and wherein said reaction product is hydrogenated to form an alcohol product, the improvements which comprises subjecting a heavy petroleum residuum to a temperature between 480° to 540° C. and pressures from 1.5 to 2 atmospheres to recover a distillate product, distilling said distillate product in the presence of caustic, adding an anti-oxidant amount of diphenyl amine, fractionating the naphtha distillates into fractions comprising $C_7$, $C_8$ and $C_9$ hydrocarbons having a peroxide number of <0.1, passing at least one of said fractions to the carbonylation zone and recovering a superior alcohol product suitable for the preparation of high quality plasticizers.

4. In a method of preparing esters of improved plasticizer quality wherein an olefin containing feed is reacted with CO and $H_2$ in the presence of a carbonylation catalyst at elevated temperatures and pressures to produce an aldehyde product containing one more carbon atom than the olefin in said feed and wherein the aldehyde product is hydrogenated to produce the corresponding alcohol product which is subsequently reacted with a compound adapted to form the corresponding ester, the improvement which comprises subjecting a heavy petroleum fraction to a coking temperature within the range of 454° to 740° C. and a pressure of from 1 to 10 atmospheres to produce a distillate, fractionating said distillate into fractions containing $C_7$, $C_8$ and $C_9$ hydrocarbons while maintaining the peroxide number at about <0.1 and employing at least one of said fractions as the said olefin containing feed.

5. A method in accordance with claim 4 wherein said compound is selected from the group consisting of phthalic acid and phthalic anhydride.

6. A process in accordance with claim 5 wherein an anti-oxidant amount of inhibitor is added to the distillate from the coking reaction and wherein the distillate is washed with aqueous caustic prior to fractionation into the $C_7$–$C_9$ fractions.

References Cited in the file of this patent

UNITED STATES PATENTS

| 2,695,315 | Parker | Nov. 23, 1954 |
| 2,735,806 | Molstedt et al. | Feb. 21, 1956 |
| 2,751,404 | Lopmann | June 19, 1956 |
| 2,752,386 | Ackroyd et al. | June 26, 1956 |
| 2,752,396 | Harvey et al. | June 26, 1956 |
| 2,754,321 | Hoog et al. | July 10, 1956 |

OTHER REFERENCES

Weir: T. A. C. Report A1ML–1(T. O. M. No. 6), July 30, 1945, pages 5 to 7.